(12) United States Patent
Villacres Mesias et al.

(10) Patent No.: US 10,106,103 B2
(45) Date of Patent: Oct. 23, 2018

(54) GUIDE RIB STRUCTURE FOR SLIDING MECHANISM

(71) Applicant: FORD GLOBAL TECHNOLOGIES, LLC, Dearborn, MI (US)

(72) Inventors: Diego Fabricio Villacres Mesias, San Mateo Atenco (MX); Pablo Isaac Villalva Sanchez, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 40 days.

(21) Appl. No.: 15/354,368

(22) Filed: Nov. 17, 2016

(65) Prior Publication Data

US 2018/0134248 A1 May 17, 2018

(51) Int. Cl.
*B60R 13/02* (2006.01)
*B62D 25/04* (2006.01)
*B60R 22/20* (2006.01)

(52) U.S. Cl.
CPC ............ *B60R 13/025* (2013.01); *B62D 25/04* (2013.01); *B60R 22/201* (2013.01); *B60R 2013/0281* (2013.01); *B60R 2013/0287* (2013.01); *B60R 2013/0293* (2013.01)

(58) Field of Classification Search
CPC ....... B60R 13/02; B60R 13/025; B60R 22/20; B60R 22/201; B62D 25/04
USPC ...................................................... 296/1.08
See application file for complete search history.

(56) References Cited

U.S. PATENT DOCUMENTS

| | | |
|---|---|---|
| 5,044,666 A | 9/1991 | Griesemer |
| 5,863,071 A | 1/1999 | Li-Calso |
| 6,059,342 A | 5/2000 | Kawai et al. |
| 6,244,626 B1 | 6/2001 | Monaghan et al. |
| 6,929,286 B2 | 8/2005 | Bertelle et al. |
| 7,198,300 B2 | 4/2007 | Daume et al. |
| 7,934,748 B2 | 5/2011 | Torii |
| 7,963,551 B2 | 6/2011 | Matsuoka et al. |
| 8,403,612 B2 | 3/2013 | Wright et al. |
| 2005/0253366 A1 | 11/2005 | Uno et al. |
| 2007/0138783 A1 | 6/2007 | Gleason et al. |
| 2007/0241549 A1 | 10/2007 | Boelstler et al. |
| 2016/0001737 A1* | 1/2016 | Ando ............... B60R 22/201 296/193.06 |

(Continued)

FOREIGN PATENT DOCUMENTS

| | | |
|---|---|---|
| CN | 1414916 A | 4/2003 |
| CN | 202782988 U | 3/2013 |

(Continued)

OTHER PUBLICATIONS

English Machine Translation of CN1414916A.

(Continued)

*Primary Examiner* — Jason S Daniels
(74) *Attorney, Agent, or Firm* — Vichit Chea; King & Schickli PLLC (57) ABSTRACT

A sliding mechanism a first part and a second part adapted for sliding translation within the first part. A guide rib structure is included on the first part to constrain a lateral motion of the second part, including one or more ribs each defining at least one inclined plane. The guide rib structure may be a continuous rib member defining a sinusoidal or trapezoidal wave pattern, or may include a plurality of ribs each defining an inclined plane.

18 Claims, 7 Drawing Sheets

(56) References Cited

U.S. PATENT DOCUMENTS

2017/0106811 A1* 4/2017 Dublan ............... B60R 13/0206

FOREIGN PATENT DOCUMENTS

| | | | |
|---|---|---|---|
| CN | 203974712 U | 12/2014 | |
| EP | 3018016 A1 | 5/2016 | |
| JP | 02120152 A * | 5/1990 | ............ B60R 13/02 |
| JP | 2001328508 A | 11/2001 | |
| JP | 2005116492 A | 4/2005 | |
| JP | 2006346251 A | 12/2006 | |

OTHER PUBLICATIONS

English Machine Translation of CN202782988U.
English Machine Translation of CN203974712U.
English Machine Translation of JP2001328508A.
English Machine Translation of JP2006346251A.
English Machine Translation of JP2005116492A.
Office Action dated Mar. 9, 2018 for U.S. Appl. No. 15/354,494, filed Nov. 17, 2016.

* cited by examiner

Section A-A'

FIG. 4

Section B-B'

GUIDE RIB STRUCTURE FOR SLIDING MECHANISM

TECHNICAL FIELD

This disclosure relates generally to sliding mechanisms for vehicle parts. In particular, the disclosure relates to a guide rib structure for improving a sliding translation between vehicle parts.

BACKGROUND

For vehicles wherein a movable vehicle part generally referred to as a slider slidingly translates from one position to another relative to another vehicle part, a smooth sliding action is essential for user satisfaction. Any discontinuity or erratic movement between the slider and the other vehicle part contributes to user dissatisfaction, being interpreted as improper fit and/or finish.

Preliminarily, various terms are used herein to describe movement of vehicle parts relative to one another, such as movement of a slider on and/or in another vehicle part. As used herein, unless stated otherwise motion descriptors such as "vertical," "up-down," "upwardly," "downwardly," "lateral," "laterally," and "side to side" refer to movement of a slider relative to a path of travel of the slider on and/or in another vehicle part.

Figure 1:
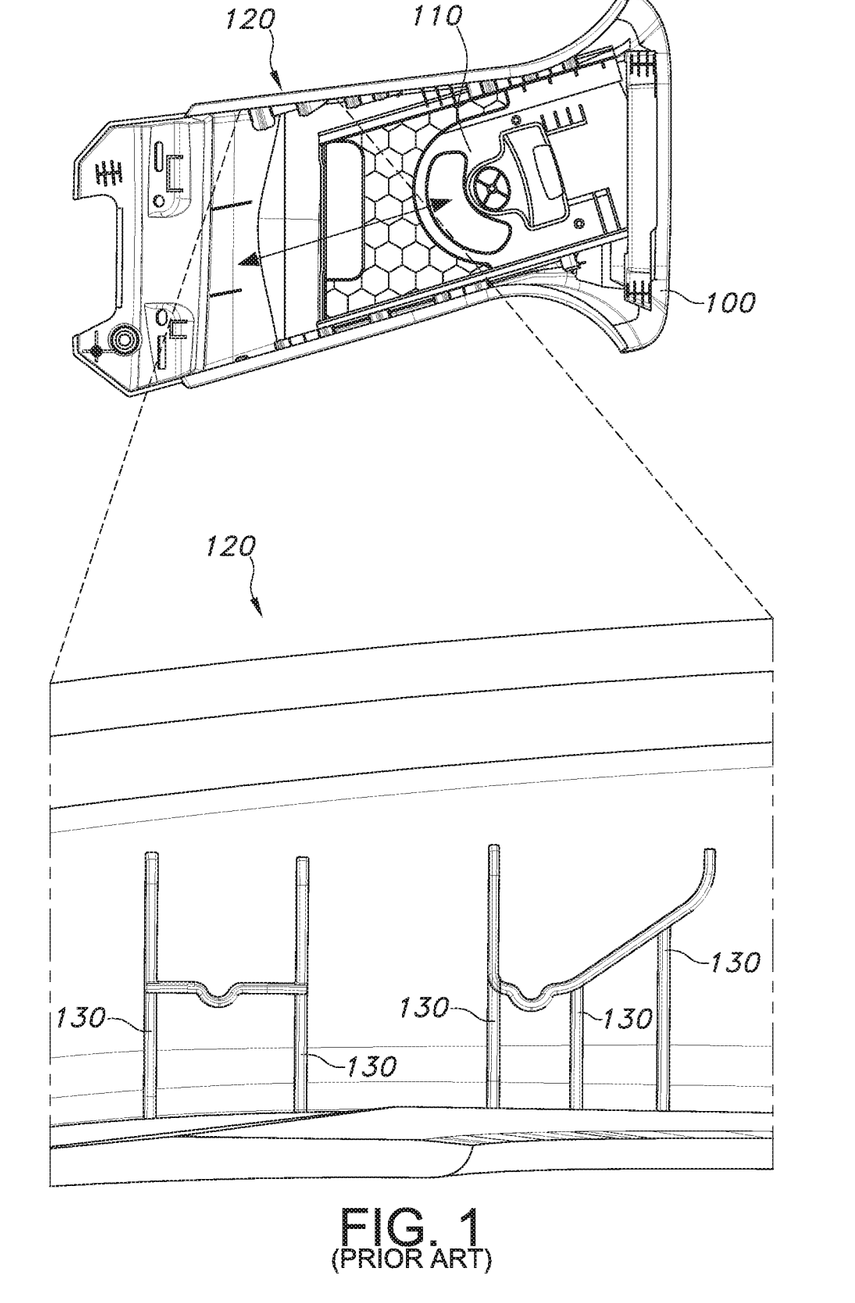
FIG. 1 illustrates a prior art guide rib structure for a sliding mechanism, in the depicted embodiment being a B-pillar trim piece having a D-ring slider for adjusting a seat belt mechanism height.

With reference to FIG. 1, as an example a B-pillar trim piece 100 is often provided with a hidden gap hider configured as a D-ring slider 110 for adjusting a seat belt height adjuster mechanism (not shown). The B-pillar trim piece 100 serves as a substrate against and within which the D-ring slider 110 slidingly translates upwardly and downwardly to adjust a height of the seat belt height adjuster mechanism to a user's personal preference.

To control this relative sliding motion, the B-pillar trim piece 100 is provided with various structures to constrain vertical and lateral movement of the D-ring slider 110, to ensure that the D-ring slider only moves in the desired directions. Typically this is done using various guide rib structures 120 (see inset) to constrain lateral movement of the D-ring slider 110 and various other guide structures (not visible in this view) to constrain vertical movement of the D-ring slider.

These guide rib structures 120 typically include a plurality of ribs 130 which are oriented in a substantially vertical orientation. That is, as shown in the drawing figure, relative to a path of travel T of the D-ring slider 110 the ribs 130 are oriented in a substantially vertical orientation which is substantially perpendicular to the D-ring slider 110's path of travel. Thus, the D-ring slider 110 contacts the ends of multiple ribs 130 of the guide rib structures 120 as it slidingly translates over/within the B-pillar trim piece 100.

Such guide rib structures 120, while serving to constrain lateral movement of the D-ring slider 110, are flawed because of the separation between the rib 130 ends, which are tactilely perceived as intermittent points of contact or "steps" between the D-ring slider and the B-pillar trim piece 100 along the D-ring slider path of travel T.

Figure 2:
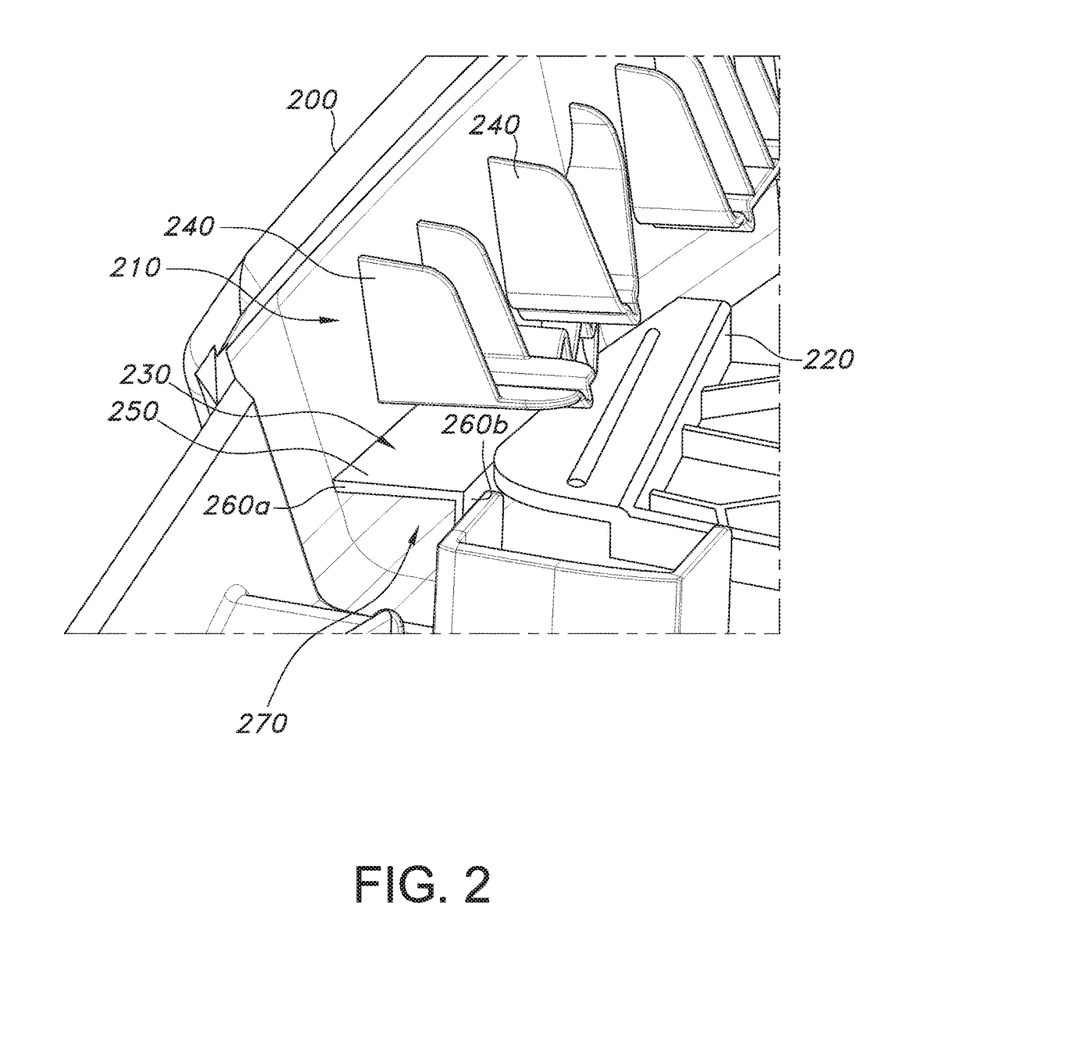
FIG. 2 illustrates an "ideal" guide rib structure.

An ideal solution would be to provide a guide rib structure 120 that is integral to the B-pillar trim piece 100 and which maintains an uninterrupted sliding contact between the D-ring slider 110 and the B-pillar trim piece as the D-ring slider translates over its path of travel T. FIG. 2 illustrates such an exemplary "ideal" guide rib structure. In the drawing figure, a substrate 200 is shown including a guide structure 210 for constraining vertical movement of a slider 220 and a guide rib structure 230 for constraining lateral movement of the slider. The guide structure 210 comprises a plurality of ribs 240 which contact a surface of the slider 220 to constrain vertical movement. The guide rib structure 230 is defined by a single rib 250 which maintains a constant contact with an edge of the slider 220 to constrain lateral movement. The rib 250 is integral to the substrate 200, contacts the substrate at one or two points of contact 260a, 260b, and defines a hollow through-bore 270.

Unfortunately, particularly in the case of molded plastic parts which must be extracted from a mold, this solution is not feasible using conventional manufacturing processes employing conventional tooling. This is in part due to the relative size of the substrate 200, the relative fragility of the guide rib structure 230/rib 250 and the difficulty of extracting both from a same mold in a single action. In particular, it would be difficult or impossible without use of specialized molding/injection techniques to provide a mold that could concurrently define the substrate 200, the guide structure 210 and the integral rib 250 in a manner that the molded piece could be removed without damaging some portion of the structure. Use of specialized techniques such as gas-assisted injection would cause gas to fill an inner void space between the guide rib structure 230 and the rib 250, in which case the component geometry would not be a hollow through-bore but instead would be a closed shell.

Thus, a need is identified in the art for vehicle parts including guide rib structures for constraining lateral motion of a moving part such as a slider, which approach the ideal solution of a constant point of contact between the slider and the vehicle part but for which fabricating by conventional molding processes is feasible.

SUMMARY

In accordance with the purposes and benefits described herein and to solve the above-summarized and other problems, in one aspect of the present disclosure a sliding mechanism is provided, comprising a first part, a second part adapted for sliding translation within the first part, and a guide rib structure provided on the first part, comprising one or more ribs each defining at least one inclined plane. The guide rib structure is adapted to constrain a lateral motion of the second part.

In an embodiment, the guide rib structure comprises a continuous rib member. In embodiments, the continuous rib member defines a sinusoidal or a trapezoidal wave pattern, the wave patterns having a same or a different wave frequency. In an alternative embodiment, the guide rib structure comprises a plurality of ribs each defining an inclined plane. A guide structure configured to constrain an up-down motion of the second part may be provided. The guide rib structure may be connected to the guide structure at one or more junctures.

In another aspect, a trim assembly for a seat belt height adjusting mechanism is provided, comprising a pillar trim panel, a gap hider adapted for sliding translation within the pillar trim panel, and a guide rib structure provided on the pillar trim panel, comprising one or more ribs each defining at least one inclined plane. The guide rib structure is adapted to constrain a lateral motion of the gap hider.

In an embodiment, the guide rib structure comprises a continuous rib member. In embodiments, the continuous rib member defines a sinusoidal or a trapezoidal wave pattern, the wave patterns having a same or a different wave frequency. In an alternative embodiment, the guide rib structure comprises a plurality of ribs each defining an inclined plane.

A guide structure configured to constrain an up-down motion of the gap hider may be provided. The guide rib structure may be connected to the guide structure at one or more junctures.

In the following description, there are shown and described embodiments of the disclosed guide rib structure for sliding mechanism. As it should be realized, the described devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the guide rib structure for sliding mechanism, and together with the description serve to explain certain principles thereof. In the drawings.

Reference will now be made in detail to embodiments of the disclosed guide rib structure for sliding mechanism, examples of which are illustrated in the accompanying drawing figures.

DETAILED DESCRIPTION

To solve the foregoing and other problems, at a high level the present disclosure provides a substrate and a slider configured for sliding translation on and/or within the substrate. The substrate includes a guide rib structure disposed at an interface of the substrate and the slider. The guide rib structure constrains lateral movement of the slider by provision of a rib or ribs having a particular configuration to significantly improve the amount of contact between the substrate and slider at that interface, to simulate the uninterrupted contact provided by the "ideal" rib 250 described above.

Figure 3:
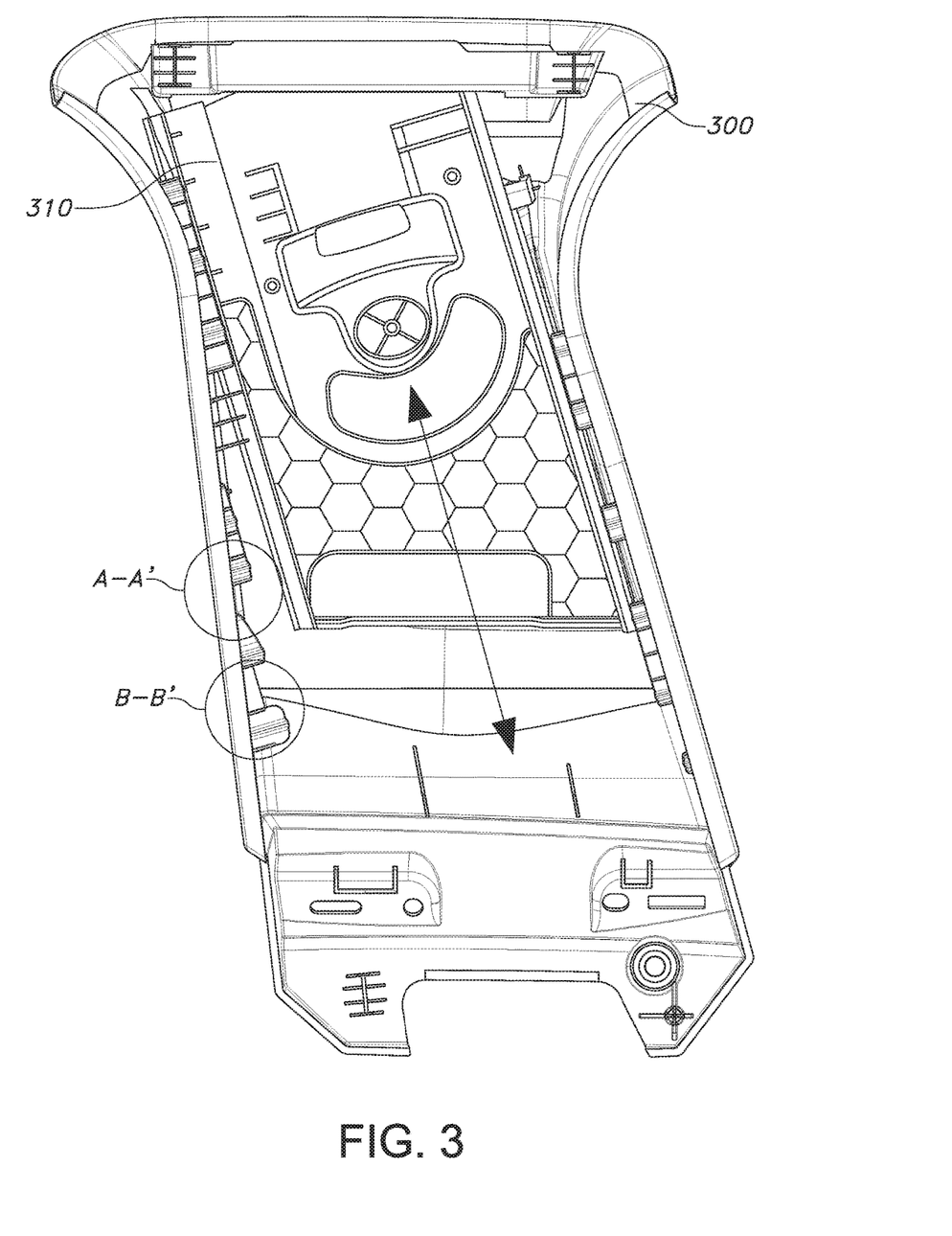
FIG. 3 depicts a substrate including a slider according to the present disclosure.

With reference to FIG. 3, an assembly comprising a substrate 300 and a slider 310 are shown, configured for a sliding translation of the slider within a portion of the substrate. In the depicted, embodiment, the substrate 300 is configured as a B-pillar trim piece and the slider 310 is configured as a gap hider for a seat belt height adjustment mechanism (not shown). However, as will be appreciated, the substrate 300 and slider 310 are easily adapted to other uses, and so this example will not be taken as limiting. In the depicted embodiments, the substrate 300 and slider 310 may be manufactured by a suitable molding process as is commonly used in the automotive industry, such as injection molding. The substrate 300 and slider 310 may be fabricated of a suitable plastic or polymer as is known in the art.

Figure 4:
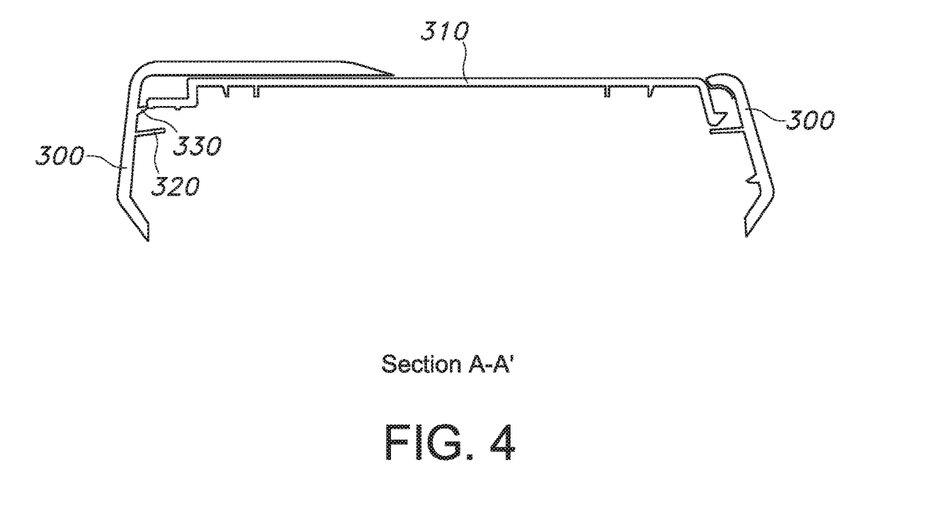
FIG. 4 depicts a cross-sectional view of an upper portion of an interface of the substrate and slider of FIG. 3, showing a portion of a guide rib structure according to the present disclosure.
Figure 5:
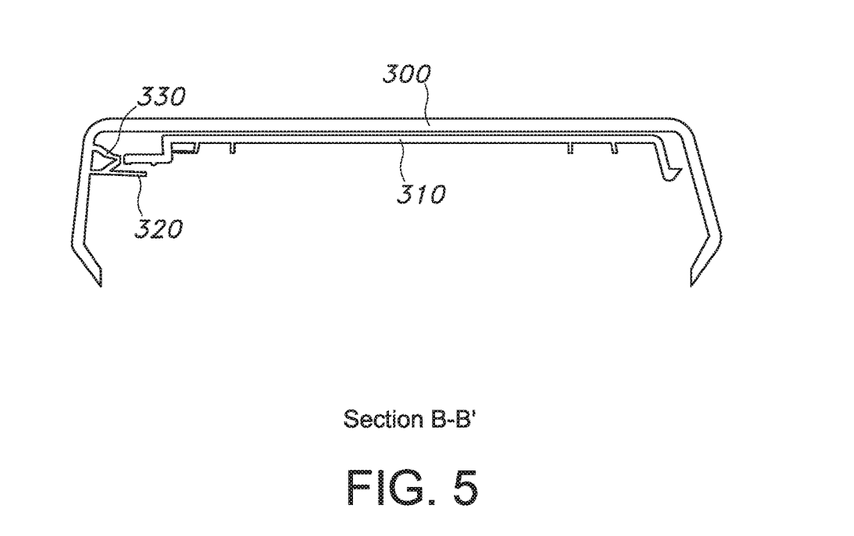
FIG. 5 depicts a cross-sectional view of a lower portion of an interface of the substrate and slider of FIG. 3, showing another portion of the guide rib structure according to the present disclosure.

Taken together, FIGS. 4 and 5 illustrate that by use of a substrate 300/slider 310 according to the present disclosure, a substantially constant contact is maintained between the substrate and the slider. FIG. 4 shows an A-A' side cross-sectional view of an upper portion of an interface of the substrate 300 and the slider 310 of FIG. 3. The substrate 300 includes at least one guide structure 320 positioned to constrain an up-down motion of the slider 310, and further includes a guide rib structure 330 positioned to constrain a lateral motion of the slider.

FIG. 5 shows a B-B' side cross-sectional view of a lower portion of the interface of the substrate 300 and the slider 310 of FIG. 3. Again, as can be seen the substrate 300 includes at least one guide structure 320 positioned to constrain an up-down motion of the slider 310, and further includes a guide rib structure 330 positioned to constrain a lateral motion of the slider.

Figure 6A:
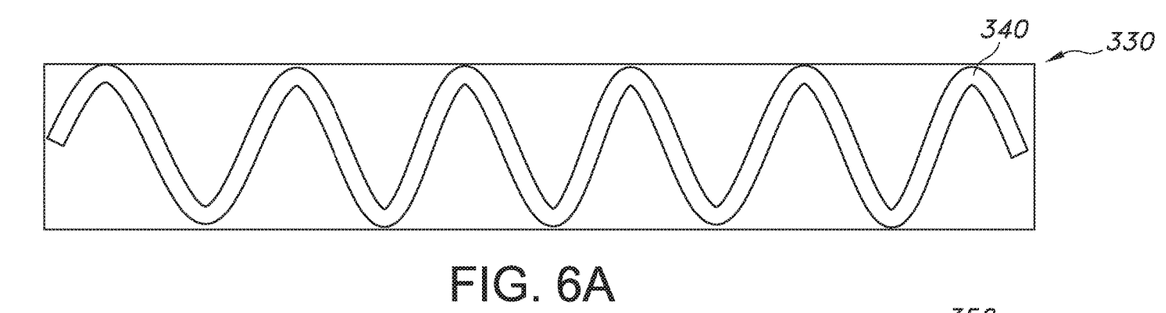
FIG. 6A depicts an embodiment of a guide rib structure according to the present disclosure.
Figure 6B:
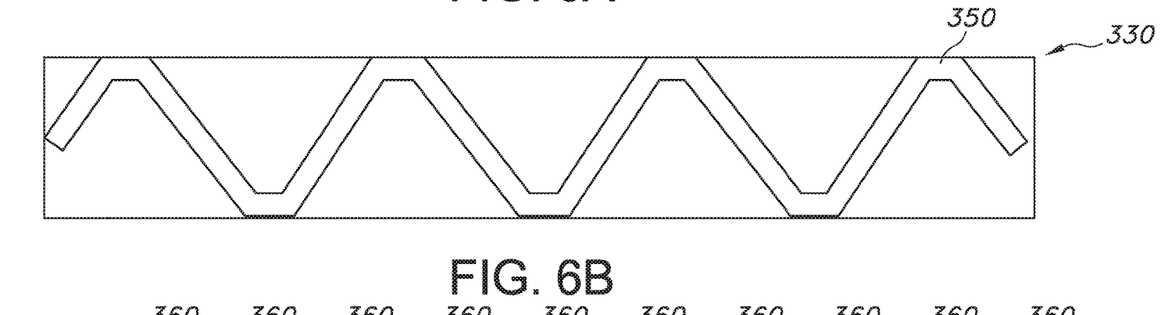
FIG. 6B depicts an alternative embodiment of a guide rib structure according to the present disclosure.

Various embodiments of the guide rib structure 330 are contemplated. With reference to FIG. 6A, in one embodiment the guide rib structure 330 comprises a continuous rib member 340, which is configured to define a sinusoidal wave pattern. In another embodiment, the guide rib structure 330 comprises a continuous rib member 350 which is configured to define a trapezoidal wave pattern (FIG. 6B). In still yet another embodiment, the guide rib structure 330 comprises a plurality of discontinuous ribs 360, each of which is disposed to define an inclined plane or acute angle A relative to the path of travel T of the slider 310 (see FIG. 3).

Figure 6C:
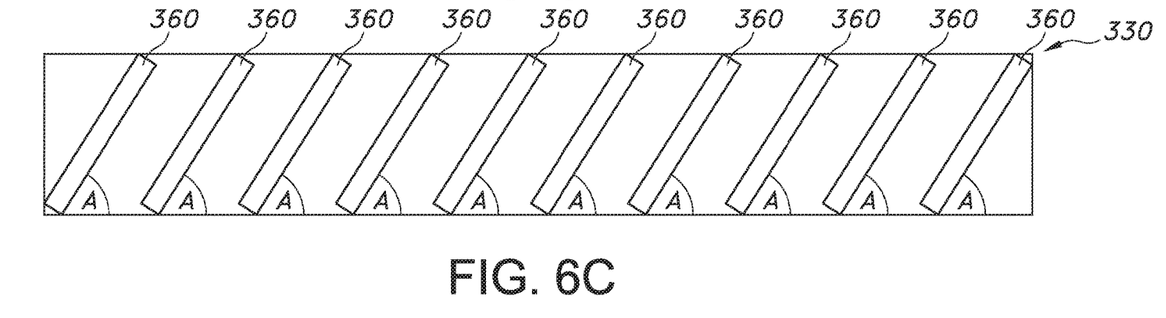
FIG. 6C depicts another alternative embodiment of a guide rib structure according to the present disclosure.

As will be appreciated, each of the continuous rib member 340 and continuous rib member 350, and discontinuous ribs 360, while not providing a fully continuous, uninterrupted point of sliding contact between the substrate 300 and the slider 310, do provide a significantly enhanced sliding contact therebetween, simulating the uninterrupted point of sliding contact as shown in FIG. 2. That is, at least one point of contact (an unbroken edge of the continuous rib member 340 and/or the continuous rib member 350, or the adjoining edges of the ribs 360) is always maintained between the substrate 300 and the slider 310, providing a smoother sliding operation by eliminating "steps" (FIGS. 6A and 6B) or by significantly reducing the pitch between "steps" (FIG. 6C). Thus, the sliding contact between the substrate 300 and the slider 310 is improved, and the "steps" encountered using the guide rib structure shown in FIG. 1 are avoided.

Figure 7A:
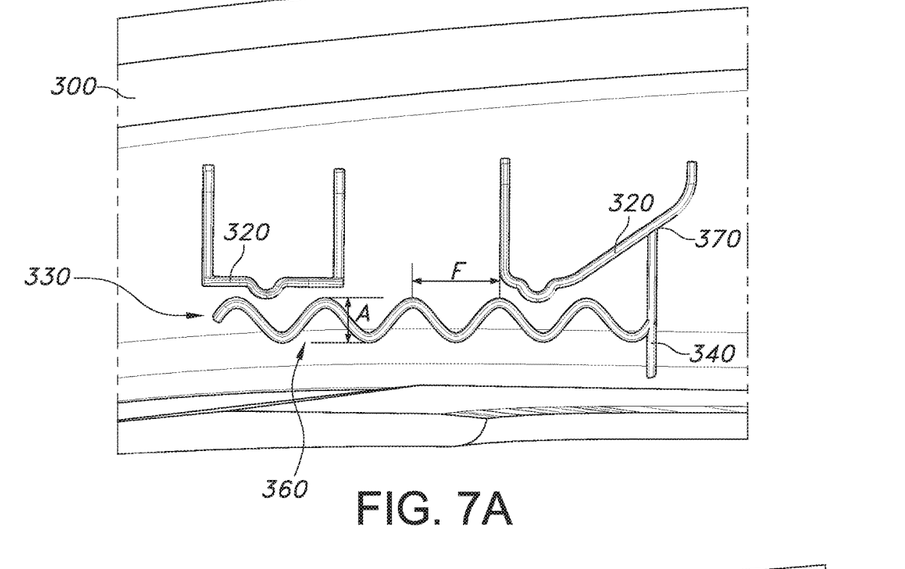
FIG. 7A shows an embodiment of the guide rib structure of FIG. 6A.

Further modifications to the guide rib structure 330 are contemplated. For the wave patterns of the continuous rib member 340 and continuous rib member 350, as is known each wave defines a frequency F and an amplitude A. As shown in FIG. 7A a guide rib structure 330 is contemplated comprising a continuous rib member 340 defining a sinusoidal wave pattern wherein each wave 360 has a same frequency F. In other embodiments (see FIGS. 7B and 7C), guide rib structures 330 are provided comprising a continuous rib member 340', 340" defining sinusoidal wave patterns wherein one or more of the waves 360 define a different frequency F. While not depicted, a similar feature can be provided for the continuous rib member 350 of FIG. 6B defining a trapezoidal wave pattern. As will be appreciated, by increasing or decreasing the frequency F of the continuous rib members 340, 340', 340", and 350, the amount of contact between the guide rib structure 330 and the slider 310 can be increased or decreased as needed according to the particular application. It will also be appreciated that the frequency F of the rib members is also a function of a minimum steel condition feasible in a mold (not shown) to provide for a robust mold design. The higher the frequency F, the better simulation of constant contact between substrate 300 and slider 310 is provided. However, the rib height is an inversely proportional function of frequency F in order to keep the design feasible.

In an embodiment, the sinusoidal wave pattern shown in FIG. 6A is selected due to a desirable material flow within a mold, reducing risk of short shots or cold weld lines, allowing fabrication of taller and thinner ribs members, and allowing increased wave frequency F. The trapezoidal wave pattern shown in FIG. 6B is compatible with lower frequency F wave patterns, as it reduces bad steel conditions in a mold. The discontinuous rib 360 pattern shown in FIG. 6C allows a higher frequency of ribs, and may be useful when a die draw does not allow ribs to be formed in different directions.

Figure 7B:
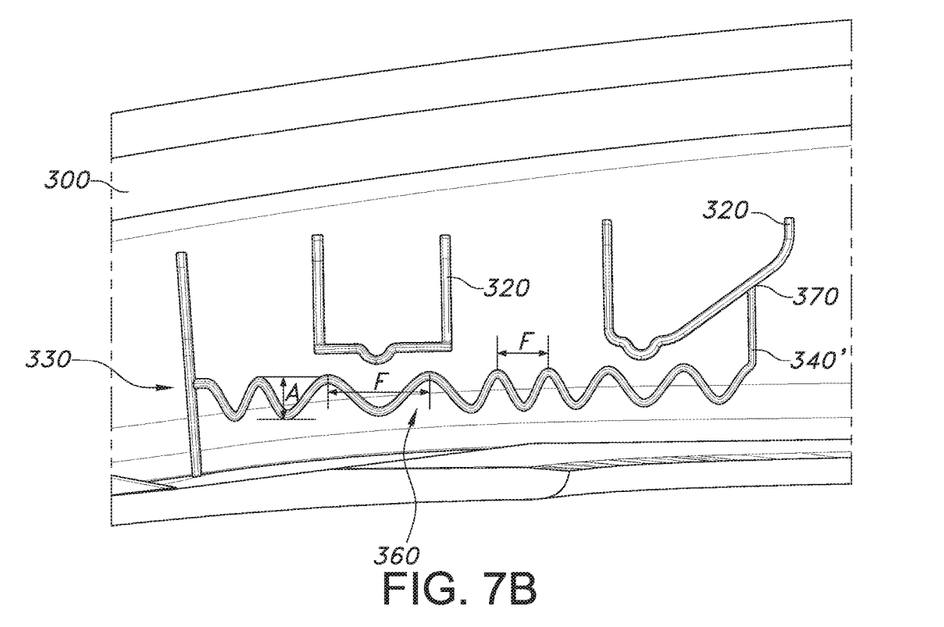
FIG. 7B shows an alternative embodiment of the guide rib structure of FIG. 6A.
Figure 7C:
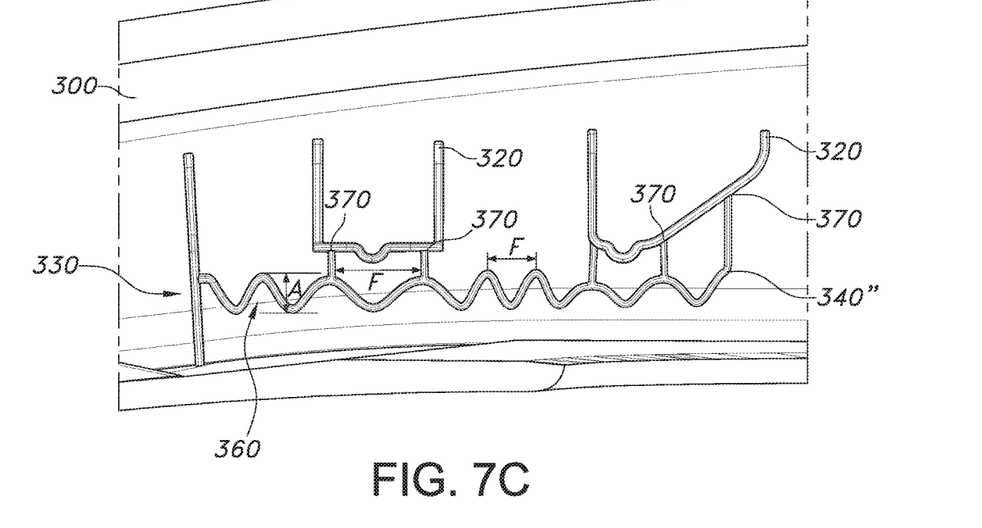
FIG. 7C shows another alternative embodiment of the guide rib structure of FIG. 6A.

While the continuous rib members 340, 340', 340", and 350 may be provided contacting only a B-class surface of the substrate 300, in embodiments it is contemplated to provide such rib members which are provided with one or more points of contact 370 also to the guide structure 320. This is depicted in FIGS. 7A-7C. As will be appreciated, this provides structural stability and rigidity to the continuous rib members 340, 340', 340", and 350 so formed.

Figure 8:
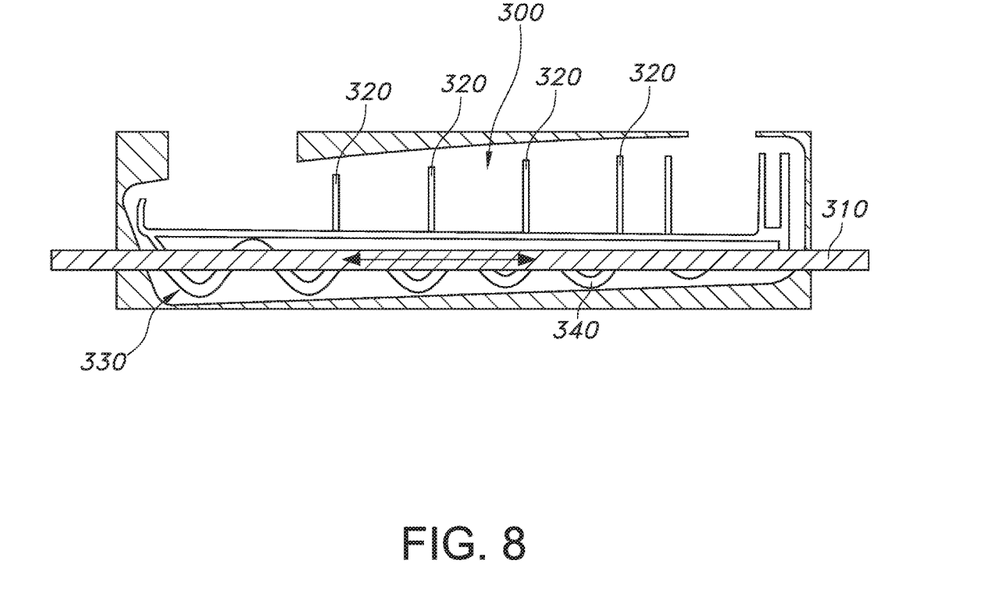
FIG. 8 shows the guide rib structure of FIG. 6A in sliding contact with a slider.

As will be appreciated, by use of the described substrate 300 including an integral guide rib structure 330 to constrain lateral movement of a slider 310, the degree of contact between the substrate 300 and slider is significantly improved, and indeed simulates the continuous contact provided by the "ideal" rib 250 described above (see FIG. 2). This is illustrated in side view in FIG. 8, showing the integral guide rib structure 330 embodiment of FIGS. 6A and 7A in sliding contact with a slider 310. By these features, a smooth sliding action between the substrate 300 and the slider 310 is provided without significant intermittent contact or "steps" during the sliding motion. Thus, user satisfaction is increased by providing devices incorporating the described features.

Advantageously, the guide rib structure 330 can be fabricated in a same mold as is used to fabricate the substrate 300, but by its configuration can be concurrently removed from the mold by a lifter without fear of damage to any portion of the substrate or guide rib structure. In turn, less material is required to manufacture the described components compared to use of separate molds to manufacture the substrate and the guide rib structure. Thus, manufacturing complexity is reduced and concomitantly cost of tooling and production are likewise reduced. As yet another advantage, the substrate 300 including the guide rib structure 330 has improved structural rigidity compared to the vertical rib guide rib structure 120 shown in FIG. 1. Still more, because the amount of material used in fabricating the guide rib structure 330 is minimal, no sink marks are created and the appearance of the A-class surface of the substrate 300 is unaffected.

The foregoing has been presented for purposes of illustration and description. It is not intended to be exhaustive or to limit the embodiments to the precise form disclosed. Obvious modifications and variations are possible in light of the above teachings. For example, the foregoing description focused on the described guide rib structures 330 can be applied to manufacture B-pillar trim piece including a gap hider a seat belt height adjustment mechanism. However, the skilled artisan will readily appreciate that the descriptions herein equally apply to any situation wherein a sliding translation of a vehicle part on or in another, static vehicle part is desired, particularly when a geometry of the static part is not parallel to that of the sliding part. For example, this may include sliding lids on quarter trim panels, sliding lids on floor consoles, etc.

All such modifications and variations are within the scope of the appended claims when interpreted in accordance with the breadth to which they are fairly, legally and equitably entitled.

What is claimed:

1. A sliding mechanism, comprising:
   a first part;
   a second part adapted for sliding translation within the first part; and
   a guide rib structure provided on the first part and defined by a continuous rib member comprising at least one inclined plane extending along a path of travel of the second part.

2. The sliding mechanism of claim 1, wherein the guide rib structure constrains a lateral motion of the second part.

3. The sliding mechanism of claim 1, wherein the continuous rib member defines a sinusoidal wave pattern.

4. The sliding mechanism of claim 3, wherein the sinusoidal wave pattern comprises a plurality of waves having a same or a different wave frequency.

5. The sliding mechanism of claim 1, wherein the continuous rib member defines a trapezoidal wave pattern.

6. The sliding mechanism of claim 5, wherein the trapezoidal wave pattern comprises a plurality of waves having a same or a different wave frequency.

7. The sliding mechanism of claim 1, wherein the guide rib structure comprises a plurality of ribs each defining an inclined plane.

8. The sliding mechanism of claim 1, wherein the first part further includes a guide structure configured to constrain an up-down motion of the second part.

9. The sliding mechanism of claim 8, wherein the guide rib structure is connected to the guide structure at one or more junctures.

10. A trim assembly for a seat belt height adjusting mechanism, comprising:
    a pillar trim panel;
    a gap hider adapted for sliding translation within the pillar trim panel; and
    a guide rib structure provided on the pillar trim panel and defined by a continuous rib member comprising at least one inclined plane extending along a path of travel of the gap hider.

11. The trim assembly of claim 10, wherein the guide rib structure constrains a lateral motion of the gap hider.

12. The trim assembly of claim 10, wherein the continuous rib member defines a sinusoidal wave pattern.

13. The trim assembly of claim 12, wherein the sinusoidal wave pattern comprises a plurality of waves having a same or a different wave frequency.

14. The trim assembly of claim 10, wherein the continuous rib member defines a trapezoidal wave pattern.

15. The trim assembly of claim 14, wherein the trapezoidal wave pattern comprises a plurality of waves having a same or a different wave frequency.

16. The trim assembly of claim 10, wherein the guide rib structure comprises a plurality of ribs each defining an inclined plane.

17. The trim assembly of claim 10, wherein the pillar trim panel further includes a guide structure configured to constrain an up-down motion of the gap hider.

18. The trim assembly of claim 17, wherein the guide rib structure is connected to the guide structure at one or more junctures.

* * * * *